United States Patent
Moldthan

(10) Patent No.: US 11,221,085 B1
(45) Date of Patent: Jan. 11, 2022

(54) PRE-RINSE SPRAY VALVE

(71) Applicant: T & S BRASS AND BRONZE WORKS, INC., Travelers Rest, SC (US)

(72) Inventor: Jason Moldthan, Greer, SC (US)

(73) Assignee: T&S Brass and Bronze Works, Inc., Traveler's Rest, SC (US)

( * ) Notice: Subject to any disclaimer, the term of this patent is extended or adjusted under 35 U.S.C. 154(b) by 13 days.

(21) Appl. No.: 16/845,264

(22) Filed: Apr. 10, 2020

Related U.S. Application Data

(63) Continuation of application No. 29/696,630, filed on Jun. 28, 2019, now Pat. No. Des. 889,599, and a continuation of application No. 29/724,932, filed on Feb. 20, 2020.

(51) Int. Cl.
| | |
|---|---|
| *F16K 27/02* | (2006.01) |
| *B05B 15/65* | (2018.01) |
| *B05B 15/63* | (2018.01) |
| *F16K 27/12* | (2006.01) |

(52) U.S. Cl.
CPC .......... *F16K 27/0209* (2013.01); *B05B 15/65* (2018.02); *F16K 27/12* (2013.01); *B05B 15/63* (2018.02)

(58) Field of Classification Search
CPC ........... E03C 1/084; B05B 1/18; B05B 1/185; B05B 15/16; F16K 27/0209; F16K 27/12
USPC .............. 137/377, 378, 379; 239/288, 288.3, 239/288.5, 428.5
See application file for complete search history.

(56) References Cited

U.S. PATENT DOCUMENTS

| | | | | |
|---|---|---|---|---|
| 2,136,050 | A * | 11/1938 | Holden | ..................... B05B 1/18 239/288.5 |
| 4,530,466 | A | 7/1985 | Rounkles et al. | |
| 5,702,057 | A * | 12/1997 | Huber | ................... B05B 15/528 239/288.3 |
| 5,732,884 | A * | 3/1998 | Jauner | ..................... A47L 17/00 137/219 |
| D462,417 | S | 9/2002 | Wales | |
| 6,820,291 | B1 | 11/2004 | Weaver | |
| D526,050 | S | 8/2006 | Gilbert | |
| 7,150,415 | B2 | 12/2006 | Weaver et al. | |

(Continued)

OTHER PUBLICATIONS

Engineer's Rendering of Spray Valve Face, revised Sep. 2, 2010, drawn Mar. 14, 1995, 1 page.
Photo Example of Various Spray Valve Faces, 2016, 1 page.

*Primary Examiner* — Kevin F Murphy
*Assistant Examiner* — Jonathan J Waddy
(74) *Attorney, Agent, or Firm* — Dority & Manning, P.A.

(57) ABSTRACT

A pre-rinse spray valve includes a spray face assembly that includes a spray face fixture that includes a face plate and a rear end flange. The face plate defines a plurality of spray holes extending axially through the face plate. Each of the plurality of spray holes is defined in part by a conically diverging surface projecting from the back side of the face plate. Overmold bores are defined through the outer periphery of the face plate. An overmold is a unitary structure that continuously covers a peripheral region of the upper surface of the face plate, a side rim of the face plate and a peripheral ledge of the face plate. The overmold includes cords, and each of the cords threads through a respective one of the overmold bores to permanently attach the overmold to the face plate.

19 Claims, 8 Drawing Sheets

(56) References Cited

U.S. PATENT DOCUMENTS

| | | |
|---|---|---|
| D566,228 S | 4/2008 | Neagoe |
| D628,898 S | 12/2010 | Barnett et al. |
| D762,816 S | 8/2016 | Hanna et al. |
| D785,131 S | 4/2017 | Cimino |
| D829,860 S | 10/2018 | Seum et al. |
| 2014/0110507 A1* | 4/2014 | Lin ........................ B05B 1/185 239/548 |
| 2015/0053790 A1* | 2/2015 | Hanna ....................... B05B 1/18 239/289 |

* cited by examiner

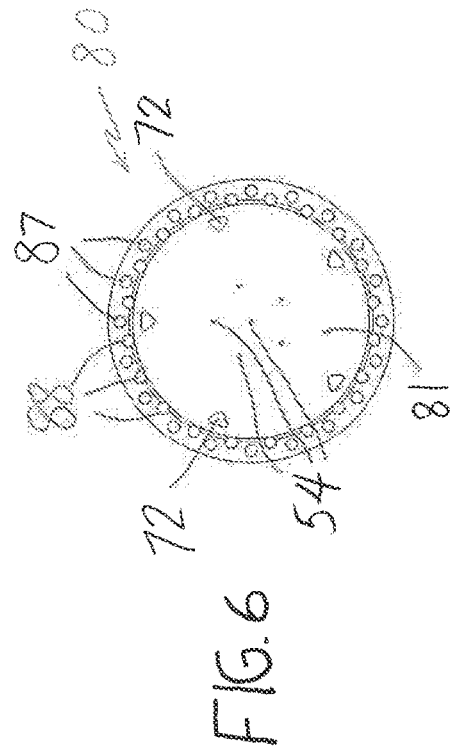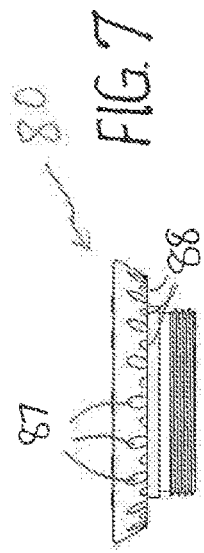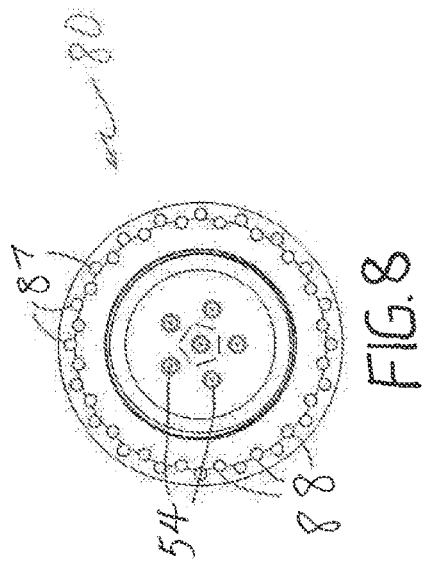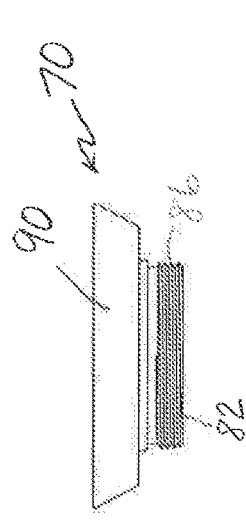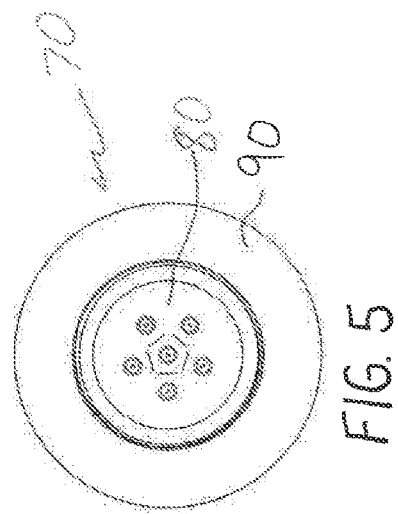

PRE-RINSE SPRAY VALVE

CROSS-REFERENCE TO RELATED APPLICATIONS

The present application claims priority to U.S. application Ser. No. 29/696,630 filed on Jun. 28, 2019, which is hereby incorporated herein by this reference for all purposes. The present application claims priority to U.S. application Ser. No. 29/724,932 filed on Feb. 20, 2020, which is hereby incorporated herein by this reference for all purposes.

STATEMENT REGARDING FEDERALLY SPONSORED RESEARCH OR DEVELOPMENT

Not applicable.

FIELD OF THE INVENTION

The subject matter disclosed herein generally involves pre-rinse spray valves for use in commercial kitchens.

BACKGROUND OF THE INVENTION

U.S. Pat. No. 7,150,415, which is hereby incorporated herein by this reference for all purposes, discloses an example of a pre-rinse spray valve for use in commercial kitchens. Such pre-rinse spray valves increasingly are called upon to do more with less. The water spray streams emanating from the outlet of these valves must remove a fixed amount of debris from the target, such as a dirty plate to be pre-rinsed, which typically is held at a distance of 8 to 12 inches from the face plate of the valve according to ASTM standards. Typical pressure and temperature of the water expelled from such pre-rinse valves can be on the order of 150 psi and 165 degrees Fahrenheit, and the seal between the face plate and the valve body must be able to remain water tight under these typical operating conditions. However, concerns about water conservation in commercial kitchens highlight the need to develop pre-rinse spray valves capable of satisfying the aforementioned ASTM standards with reduced amounts of water than historically was deemed acceptable.

The faceplates of these pre-rinse spray valves define the outlet openings that emit the water streams from the pre-rinse spray valves. The valves typically employ a threaded attachment screw inserted through the center of the faceplates to attach the faceplates to the bodies of the valves. The assembly of each valve requires tightening this screw sufficiently to secure the faceplate against the body of the valve in a watertight seal under all operating conditions of water pressure and temperature. However, that water pressure and temperature may vary depending on the water service to the commercial kitchen, and such pressure and temperature is not precisely known when the valve is assembled at the factory. Thus, the screw must be tightened to withstand the maximum pressure and temperature of the water service that can be encountered.

Faceplates made of plastic pose two drawbacks. The first is the need for outlet openings that are precisely sized in order to produce the desired flow rate of water flow through the faceplate to clean the target. The second is the need for the direction of the water streams exiting from the faceplate to stay parallel to each other in order to focus the water stream on the target. Tightening of the attachment screw can bend a plastic faceplate, and such bending distorts the openings in the faceplate. The distorted openings adversely affect the desired direction and shape of the water stream exiting from the faceplate, and the stream exiting from each opening is no longer likely to be parallel to the stream from the other openings. Because the streams are no longer parallel, the water exiting the valve is no longer focused on the target, and the cleaning power per volume of water exiting the valve becomes reduced below the optimum cleaning power. Some of these adverse effects can be overcome to some extent by providing metal inserts with machined holes in place of the holes molded in the plastic faceplate. Distortion of the faceplate during tightening does not affect the size or shape of the holes in the metal inserts, though their direction will experience some unwanted effects from the bending of the faceplate during tightening of the attachment screw. Moreover, manufacture of such a plastic faceplate with embedded metal inserts molded therein involves extra cost of the metal inserts and more complex (and thus costly) manufacturing processes than is the case for a completely plastic faceplate.

Accordingly, a need exists for a pre-rinse spray valve that can avoid the deteriorating effects that produce non-parallel streams of less than optimum cleaning power at the target site.

OBJECTS AND SUMMARY OF THE INVENTION

It is a principal object of the present invention to provide a pre-rinse spray valve that can avoid the deteriorating effects that produce non-parallel streams of less than optimum cleaning power at the target site.

It is another principal object of the present invention to provide a pre-rinse spray valve from relatively less costly materials that can be easily assembled without suffering from deteriorating effects that produce non-parallel streams of less than optimum cleaning power at the target site.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a presently preferred embodiment of a pre-rinse spray valve includes a valve housing defining a hollow valve chamber. The valve housing defines an inlet opening connected to the valve chamber. The valve housing defines an outlet opening connected to the valve chamber. A valve bonnet is received in the valve chamber and disposed between the inlet opening and the outlet opening of the valve housing. A handle is pivotally connected to the valve housing and configured and disposed to engage and activate operation of the valve bonnet to selectively permit fluid communication between the inlet opening and the outlet opening of the valve housing. A spray cup defines a rear side connected to the outlet opening of the valve housing and defines a central opening through the spray cup in fluid communication with the outlet opening of the valve housing. The spray cup defines a conically shaped conical horn that defines an annular shoulder and an internally threaded surface. The pre-rinse spray valve includes a spray face assembly that includes a spray face fixture and an overmold permanently connected to the spray face fixture. The spray face fixture includes a face plate having a back side disposed opposite a front side. The face plate defines a plurality of spray holes located in a centrally located region of the face plate and extending axially through the face plate from the front side through the back side. Each of the plurality of spray holes is defined in part by a conically diverging surface projecting from the back side of the face plate. The spray face defines a rear end flange that defines a threaded exterior surface and defines a central passage therethrough. The rear end flange of the spray face fixture defines an outer groove adjacent the threaded exterior surface of the rear end flange.

The face plate defines a first plurality of overmold bores formed axially through the outermost region of the face plate. These bores extend completely through the outermost region of the face plate and are arranged circumferentially with each pair of adjacent bores being desirably spaced evenly apart from one another as each other pair of adjacent boles. Desirably there are twenty of these bores in this first plurality of overmold bores.

The face plate desirably defines a second plurality of overmold bores formed axially through a second region of the face plate. The second region is adjacent to the outermost region but disposed inwardly toward the center of the face plate from the outermost region. Each of these boles also extends completely through the second region of the face plate. Each of these bores is arranged circumferentially around the second region relative to the center of the face plate.

The overmold desirably is a unitary structure that continuously covers a peripheral region of the upper surface of the face plate, a side rim of the face plate and a peripheral ledge of the face plate. The overmold desirably is formed of rubber or similar thermoplastic composition and includes a plurality of cords that are anchored at opposite ends and thread through the first and second plurality of overmold bores to permanently attach the overmold to the face plate. Thus, the overmold is effectively stitched to the face plate by the mechanical cooperation of the first plurality of cords of the overmold and the second plurality of cords of the overmold to attach the overmold to the face plate in a permanent fashion such that the overmold cannot be removed from the face plate without destruction of the overmold.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which:

FIG. 4 depicts a side elevation view of the spray face assembly of FIG. 3.

FIG. 5 depicts a bottom elevation view of the spray face assembly of FIG. 3.

FIG. 6 depicts a top elevation view of a spray face fixture of a presently preferred embodiment of the pre-rinse spray valve of the present invention.

FIG. 7 depicts a side elevation view of the spray face fixture of FIG. 6.

FIG. 8 depicts a bottom elevation view of a spray face fixture of FIG. 6.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible implementations of the invention.

DETAILED DESCRIPTION OF EXEMPLARY EMBODIMENTS OF THE INVENTION

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up 195 to 4.5, as well as all sub-ranges within the limit, such as from about 0 to 5, which includes 0 and includes 5 and from 5.2 to 7, which includes 5.2 and includes 7. Moreover, while specific spatial dimensions are provided for some of the exemplary embodiments described herein, the present invention is not limited to embodiments with those specific spatial dimensions.

Figure 1:
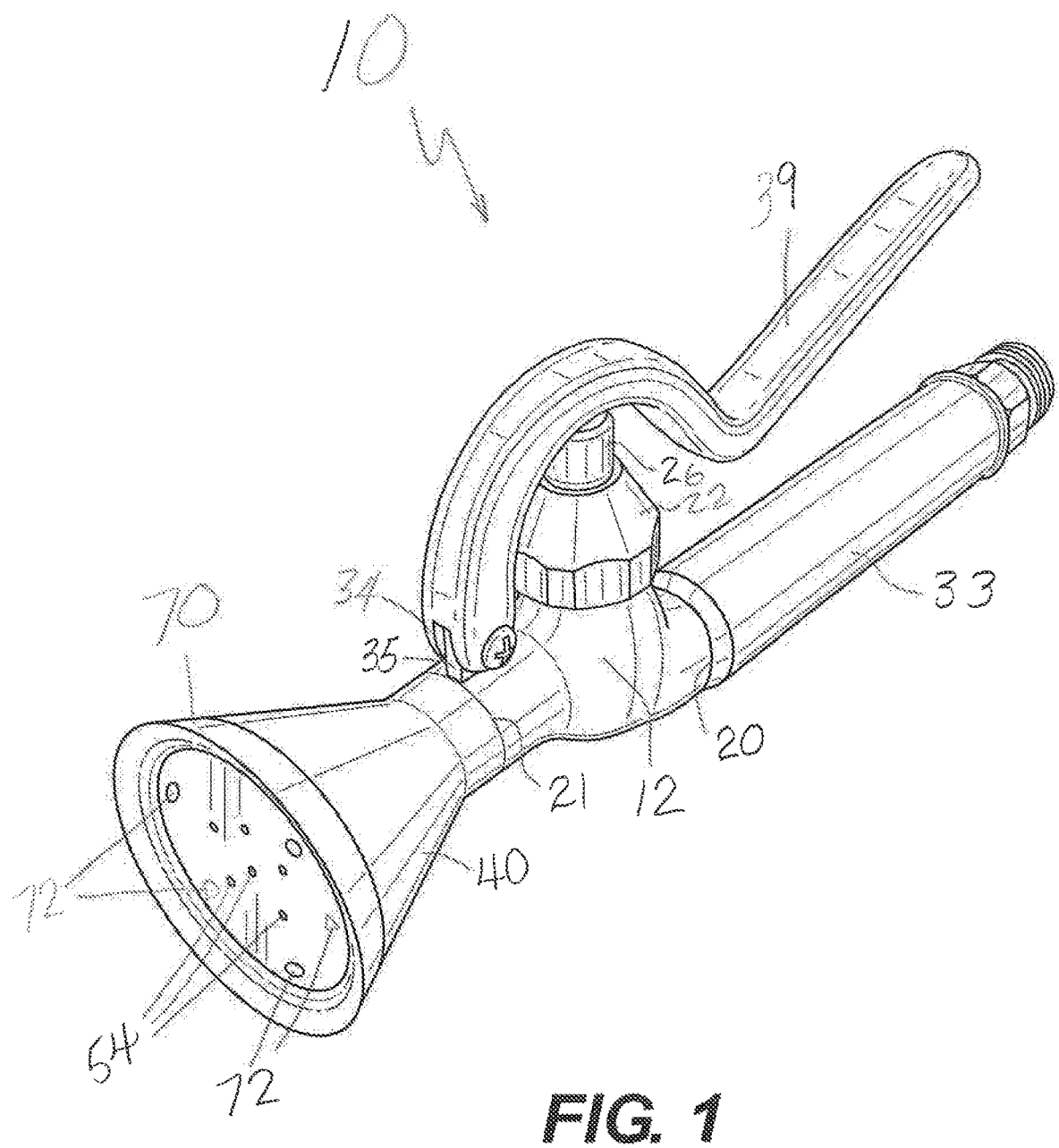
FIG. 1 depicts a perspective view of a presently preferred embodiment of the pre-rinse spray valve of the present invention.
Figure 2:
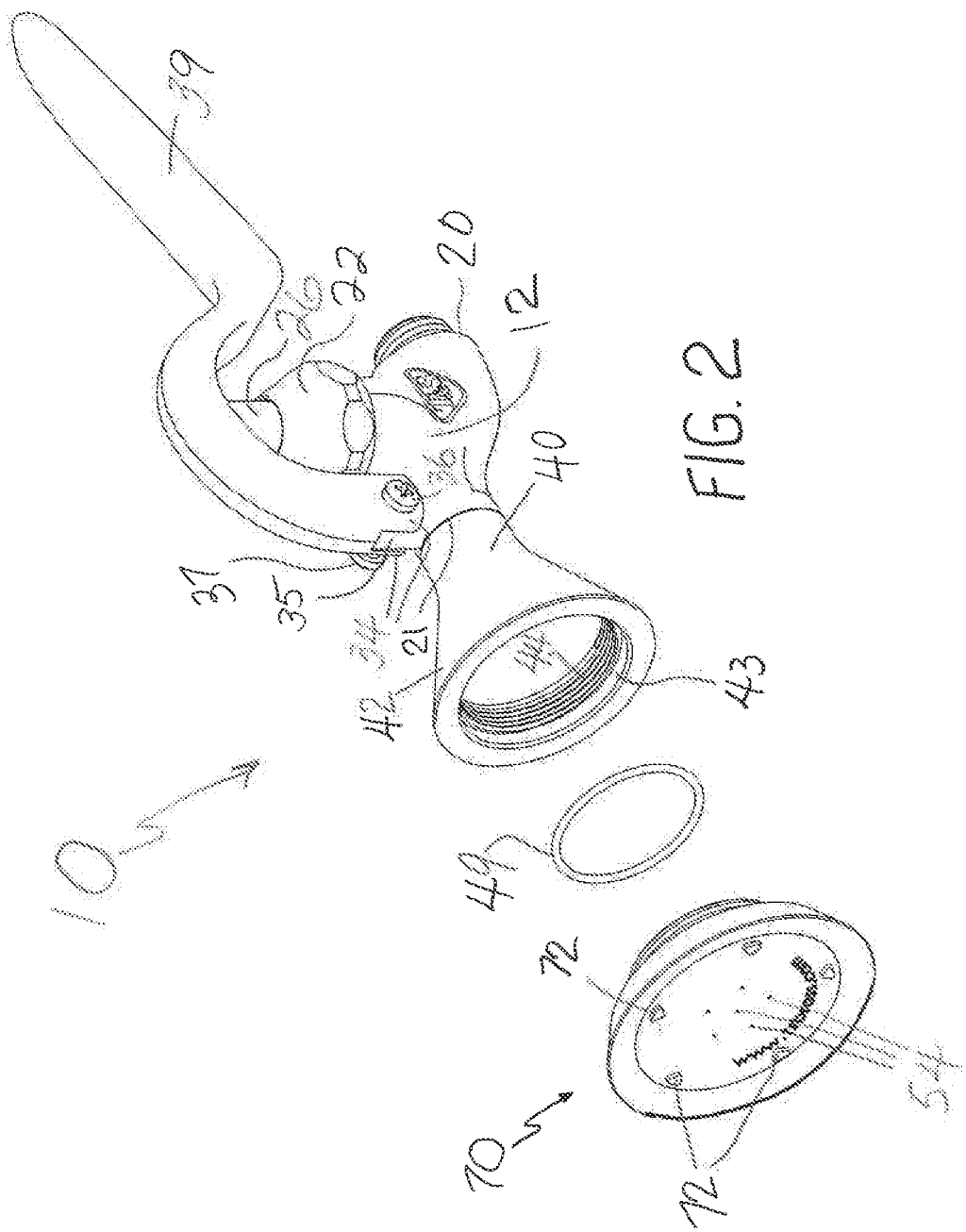
FIG. 2 depicts a perspective view of the partially disassembled embodiment of FIG. 1.
Figure 3:
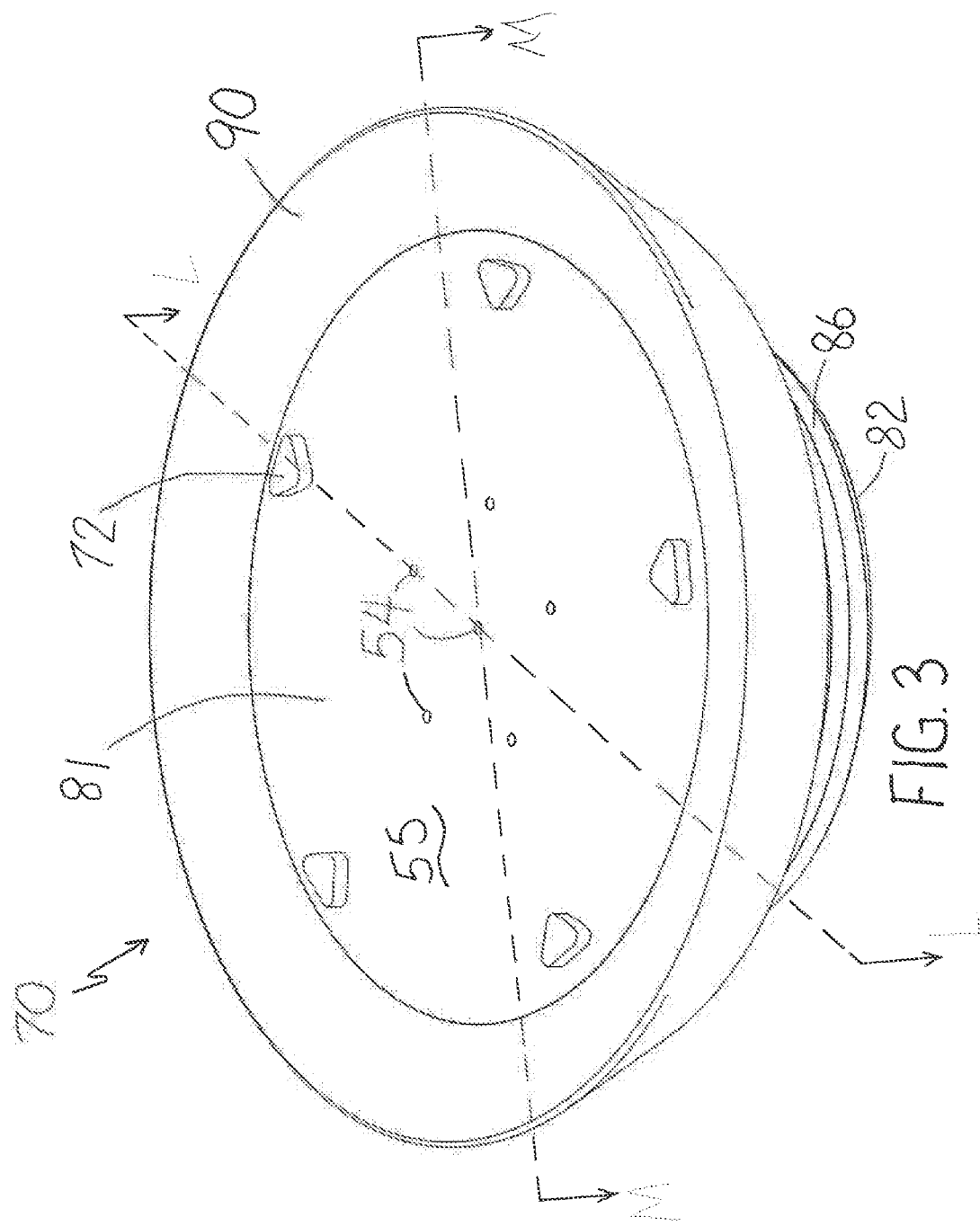
FIG. 3 depicts a perspective view from above a presently preferred embodiment of a spray face assembly in accordance with the present invention.

FIG. 1 depicts a perspective view of a presently preferred embodiment of the pre-rinse spray valve 10 of the present invention. FIG. 2 depicts a perspective view of a partially disassembled presently preferred embodiment of the pre-rinse spray valve 10 of the present invention. In accordance with the present invention, FIG. 3 depicts a perspective view from above a presently preferred embodiment of a spray face assembly, which is generally designated by the numeral 70. As schematically shown in FIG. 2, the pre-rinse spray valve 10 of the present invention includes a spray face assembly 70.

Each of FIG. 3, FIG. 4 and FIG. 5 shows a different view of a presently preferred embodiment of a spray face assembly 70 in accordance with the present invention. The spray face assembly 70 includes a face plate fixture that is generally designated in each of FIG. 6, FIG. 7, FIG. 8, FIG. 9 and FIG. 10 by the numeral 80. The spray face fixture 80 desirably is molded from an engineering thermoplastic polymer that is used in precision parts and provides good strength, low friction, excellent dimensional stability and high stiffness such as polyoxymethylene, also known as acetal, polyacetal and polyformaldehyde. Suitable engineering thermoplastic polymer is available from Celanese Corporation of America (celenese.com) headquartered in Texas under the trade name CELCON®. A presently preferred embodiment of the spray face fixture 80 is formed of CELCON® M90 available from Celanese Corporation of America.

Figure 9:
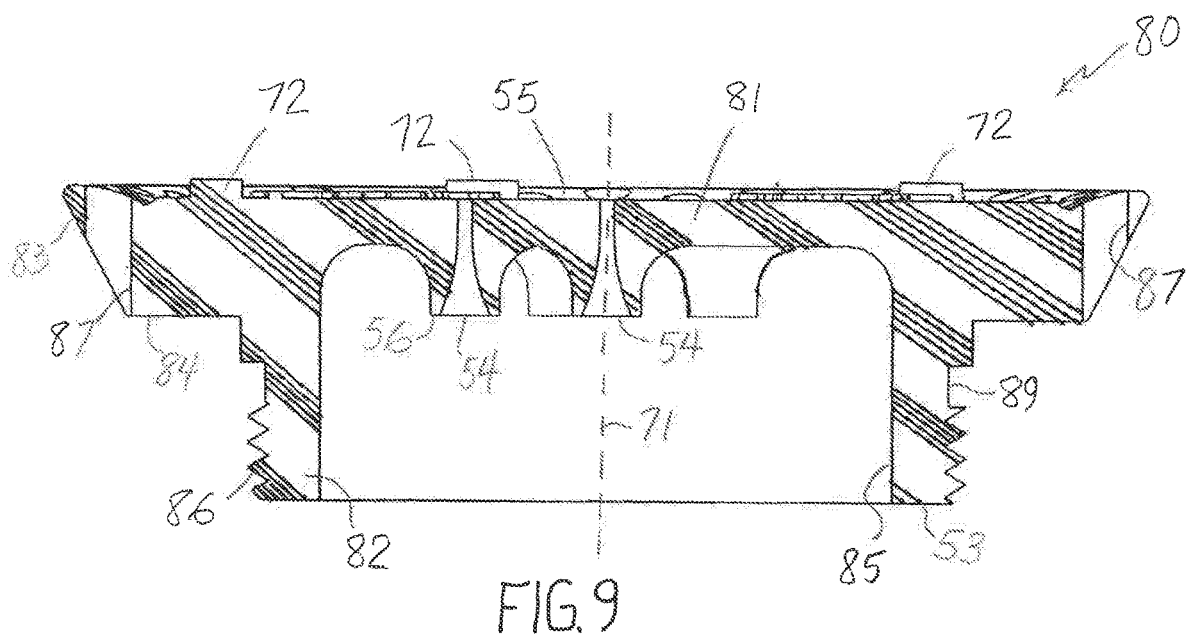
FIG. 9 depicts a cross-sectional view of the spray face fixture of FIG. 6 taken along the lines of sight M-M in FIG. 3.
Figure 10:
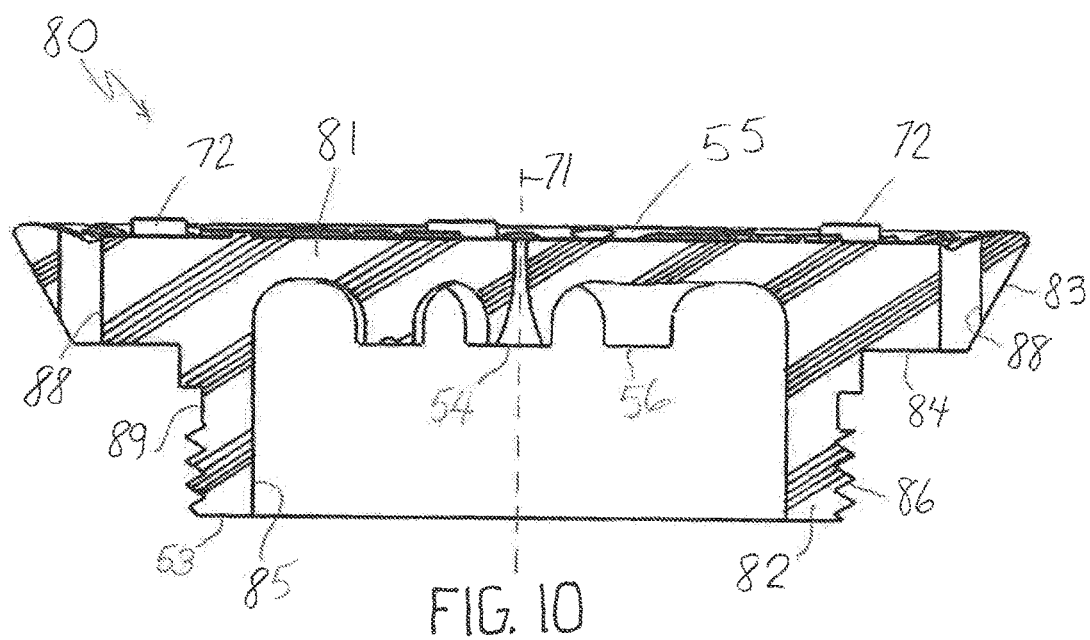
FIG. 10 depicts a cross-sectional view of a spray face fixture of FIG. 6 taken along the lines of sight L-L in FIG. 3.

As shown in FIG. 9 and FIG. 10, the face plate fixture 80 includes a face plate 81 and a rear end flange 82 integrally connected to the face plate 81. Desirably, the entire spray face fixture 80 is so molded as a unitary structure so that the face plate 81 and the rear end flange 82 are integrally formed together in the same molding step of an injection molding process. A dashed line schematically represents a virtual central axis 71 that extends through the face plate fixture 80 in an axial direction and provides a virtual reference axis. The face plate 81 defines a front side 55 and a back side 56 disposed opposite the front side 55 and spaced apart from the front side 55 in the axial direction along the central axis 71. The face plate 81 defines a side rim 83 extending from and connecting the front side 55 to the back side 56. The back side 56 of the face plate 81 defines a peripheral ledge 84 that is an annular surface disposed between the side rim 83 and the rear end flange 82.

Figure 11:
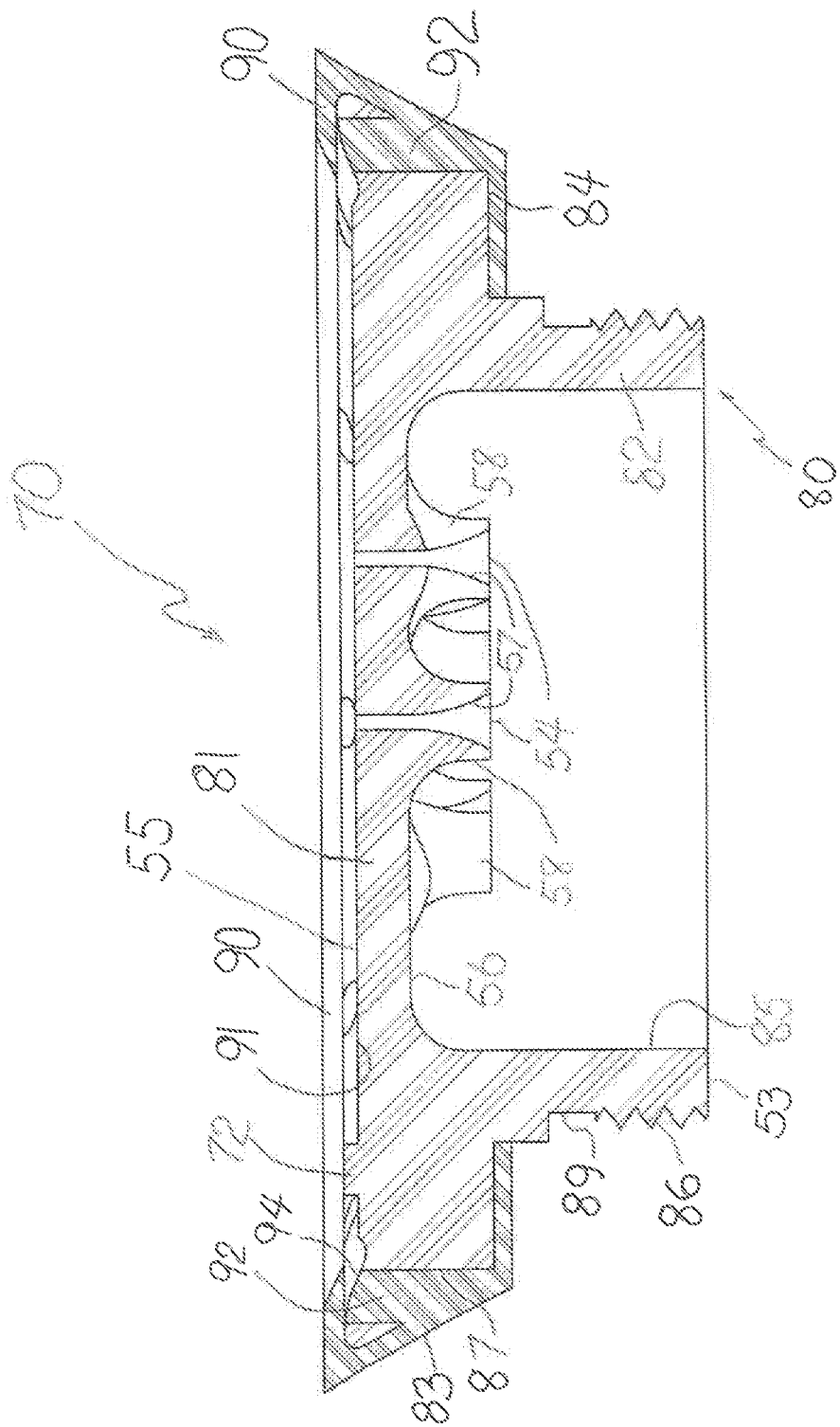
FIG. 11 depicts a cross-sectional view of a spray face assembly taken along the lines of sight L-L in FIG. 3.
Figure 12:
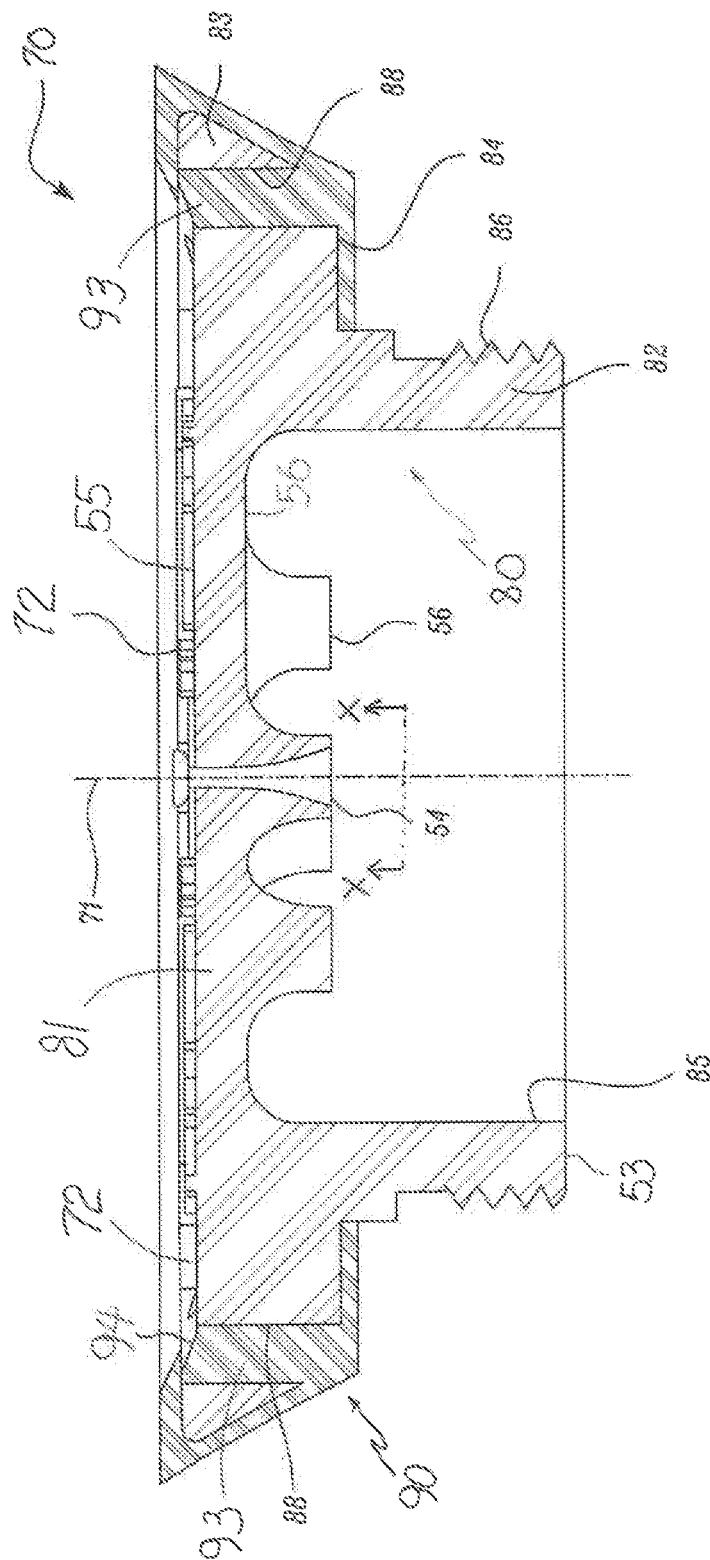
FIG. 12 depicts a cross-sectional view of a spray face assembly taken along the lines of sight M-M in FIG. 3.
Figure 14:
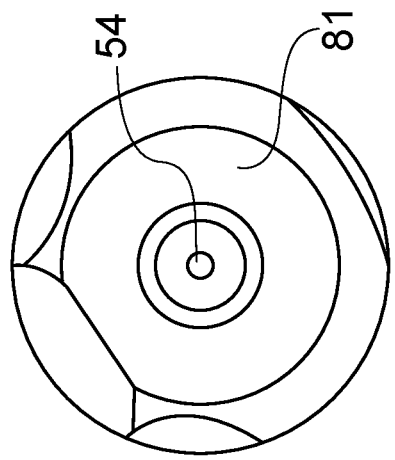
FIG. 14 is a front elevation view taken in the direction of arrows X-X in FIG. 12.
Figure 15:
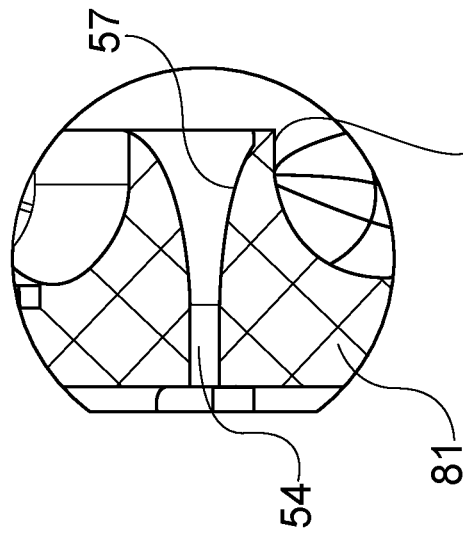
FIG. 15 is a cross-sectional view of the detail shown in FIG. 14 taken in the same plane of the view shown in FIG. 12.

As shown in FIG. 9 and FIG. 10, the rear end flange 82 of the face plate fixture 80 defines a front end and a rear end disposed spaced apart from the front end in the axial direction. The rear end flange 82 extends in the axial direction from the back side of the face plate 81. The rear end flange 82 defines a central passage 85 disposed symmetrically about the central axis 71 extending in the axial direction and internally of the rear end flange 82. The rear end flange 82 defines a threaded exterior surface that is configured with threads 86 intended to mate with and be screwed into threads 44 defined in an interior section of the horn 42 of the spray cup 40 of the pre-rinse spray valve of the present invention. As shown in FIG. 11 and FIG. 12, a groove 89 desirably is defined immediately adjacent the threaded exterior surface 86 of the rear end flange 82 of the spray face fixture 80, and the groove 89. The groove 89 is configured to receive therein a face sealing O-ring 49 (FIG. 2) formed of pliable and deformable material such as rubber prior to screwing the spray face assembly 70 into water-tight connection with the spray cup 40 and thereby ensure a watertight seal between the spray face assembly 70 and the spray cup 40.

As shown in FIG. 6, FIG. 7, FIG. 8 and FIG. 9, the face plate 81 defines a first plurality of overmold bores 87 that are formed axially through the outermost region of the face plate 81. These overmold bores 87 extend completely through the outermost region of the face plate 81 and are arranged circumferentially with each pair of adjacent overmold bores 87 being desirably spaced evenly apart from one another as each other pair of adjacent overmold bores 87. Desirably there are twenty of these overmold bores 87 in this first plurality of overmold bores 87, and each of these overmold bores is defined by the same first diameter. Variation in the number of overmold bores 87 and their dimensions can be made to suit the configuration and dimensions of the face plate 81.

As shown in FIG. 6, FIG. 7, FIG. 8 and FIG. 10, the face plate 81 desirably includes a second plurality of overmold bores 88 that are formed axially through a second region of the face plate 81. The second region is adjacent to the outermost region but disposed inwardly from the outermost region toward the central axis 71 of the face plate 81. Each of these overmold bores 88 also extends completely through the second region of the face plate 81. Each of these overmold bores 88 is arranged circumferentially around the second region relative to the central axis 71 of the face plate 81. Each of the adjacent overmold bores 88 in each pair of adjacent overmold bores 88 desirably is spaced evenly apart from one another as each other pair of adjacent overmold bores 88 in the second region of the face plate 81. Desirably there are twenty of these overmold bores 88 in this second plurality of overmold bores 88, and each of these overmold bores is defined by the same second diameter. The second diameter of each of the overmold bores 88 in this second plurality of overmold bores 88 desirably is slightly smaller than the first diameter of each of the overmold bores 87 constituting the first plurality of overmold bores 87. Variation in the number of overmold bores 88 and their dimensions can be made to suit the configuration and dimensions of the face plate 81.

As shown in FIG. 3, FIG. 4, FIG. 5, FIG. 11 and FIG. 12, the spray face assembly 70 in accordance with the present invention includes an overmold 90, which desirably is a unitary structure that is permanently attached to the face plate 81 of the spray face fixture 80 and continuously covers a peripheral region of the upper surface of the front side 55 of the face plate 81, the side rim 83 of the face plate 81 and the peripheral ledge 84 of the face plate 81. The overmold 90 desirably is formed of rubber or similar thermoplastic elastomeric composition. A thermoplastic elastomer having a property of 75 Shore A durometer is suitable for the overmold 90 in accordance with a presently preferred embodiment of the invention.

The overmold 90 desirably is attached to the face plate 81 in the following manner. The face plate 81 is disposed inside an injection molding tool, and the rubber composition for the overmold 90 in molten form is injected under pressure into the tool. As schematically shown in FIG. 11, the molten rubber composition overlays the face plate 81 and defines an underside 91 that is disposed in contact with the front side 55 of the face plate 81. The overmold envelops the side rim 83 and peripheral ledge 84 of the face plate 81. The molten rubber composition also completely fills each of the overmold bores 87 constituting the first plurality of overmold bores 87 and defines a first plurality of cords 92, Each of the first plurality of cords 92 extends axially from the underside 91 of the overmold and through a respective one of the overmold bores 87 of the first plurality of overmold bores 87.

Once the molten rubber composition cures, then the portion of the rubber composition that fills each of the first plurality of overmold bores 87 forms the first plurality of cords 92. As shown in FIG. 11, each cord 92 extends from the upper surface 94 of the overmold 90 continuously through the overmold bore 87 and through to the portion of the overmold 90 that covers the side rim 83 of the face plate 81. In this way, each of the first plurality of overmold bores 87 and the first plurality of cords 92 cooperate mechanically to attach the overmold 90 to the face plate 81 in a permanent fashion such that the overmold 90 cannot be removed from the face plate 81 without destruction of the overmold 90.

While the face plate 81 is disposed inside an injection molding tool, and the rubber composition for the overmold 90 in molten form is injected under pressure into the tool, the molten rubber composition also completely fills each of the overmold bores 88 constituting the second plurality of overmold bores 88 and defines a second plurality of cords 93 as schematically shown in FIG. 12. Each of the second plurality of cords 93 extends axially from the underside 91 of the overmold 90 and extends through a respective one of the overmold bores 88 of the second plurality of overmold bores 88. Once the molten rubber composition cures, then the portion of the rubber composition that fills each of the second plurality of overmold bores 88 forms the second plurality of cords 93. As schematically shown in FIG. 12, each of the second plurality of cords 93 extends from the upper surface 94 of the overmold 90 continuously through the overmold bore 88 and through to the portion of the overmold 90 that covers the peripheral ledge 84 of the face plate 81. Each of the second plurality of cords 93 also extends from the upper surface 94 of the overmold 90 continuously through the overmold bore 88 and through to the portion of the overmold 90 that covers the lower portion of the side rim 83 of the face plate 81. In this way, each of the second plurality of overmold bores 88 and the second plurality of cords 93 cooperate mechanically to attach the overmold 90 to the face plate 81 in a permanent fashion such that the overmold 90 cannot be removed from the face plate 81 without destruction of the overmold 90.

As schematically shown in FIG. 11, one of the opposite ends of each of the first plurality of cords 92 of the overmold 90 becomes anchored to the portion of the overmold 90 that covers the side rim 83 of the face plate 81. Similarly, as schematically shown in FIG. 12, one of the opposite ends of each of the second plurality of cords 93 of the overmold 90 becomes anchored to the portion of the overmold 90 that covers the peripheral ledge 84 of the back side 56 of the face plate 81 as well as to the portion of the overmold 90 that covers the lower portion of the side rim 83 of the face plate 81. Thus, the overmold 90 is effectively stitched to the face plate 81 by the mechanical cooperation of the first plurality of cords 92 of the overmold 90 and the second plurality of cords 93 of the overmold 90.

As schematically shown in FIG. 2, FIG. 3, FIG. 6, FIG. 9 and FIG. 10, the face plate 81 defines a plurality of tool projections 72, and five tool projections 72 are shown in these FIGs. Each tool projection 72 extends in the axial direction away from the front side 55 of the face plate 81. Each tool projection 72 desirably is configured for being received by a tool for facilitating rotation of the spray face assembly into the spray cup 40 during assembly or disassembly of the pre-rinse spray valve 10. Because each tool projection 72 is raised above the planar surface of the rest of the front side 55 of the face plate 81, any possibility of accumulation of any debris on the front side 55 of the face plate 81, which easily be cleaned of any debris, is greatly diminished.

Figure 13:
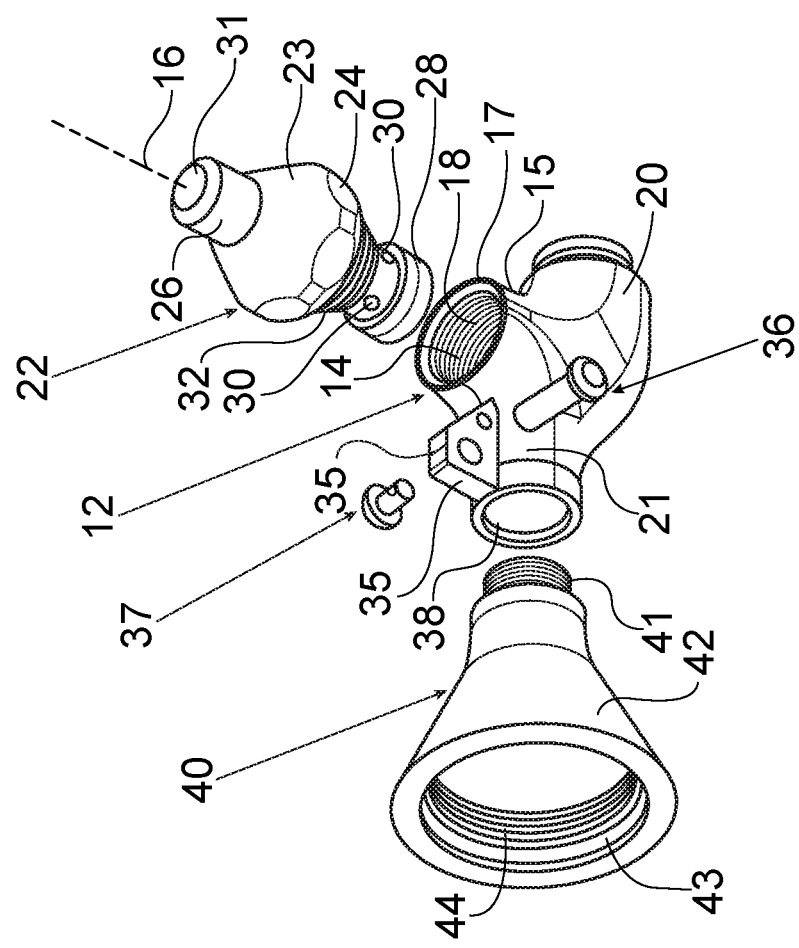
FIG. 13 is an elevated perspective assembly view of a presently preferred embodiment of components of the pre-rinse spray valve of FIG. 2.

A presently preferred embodiment of a pre-rinse spray valve of the present invention, which includes a spray valve assembly 70 as described above, is shown in an elevated perspective view in FIG. 1 and FIG. 2 and is represented generally by the numeral 10 and desirably includes a valve housing 12. A perspective assembly view of some of the components of the pre-rinse spray valve is shown in FIG. 13, in which the valve housing 12 defines internally a valve chamber 14 that is defined by a cylindrical wall 15 about a central axis 16. The valve chamber 14 is open at an entrance 17, which is axially disposed opposite a closed end of the valve chamber 14. The interior surface of the cylindrical wall 15 defines the hollow interior of the valve chamber 14 and is provided with a threaded surface 18 at the entrance 17 of the valve chamber 14. The valve housing 12 includes a cylindrical inlet 20 and a cylindrical outlet 21 disposed transversely with respect to the axis of the valve chamber 14. During normal operation of the pre-rinse spray valve 10, pressurized fluid flows into the valve housing 12 via the inlet 20 and flows downstream before exiting the valve housing 12 via the outlet 21. The valve chamber 14 is disposed between the cylindrical inlet 20 and the cylindrical outlet 21, and the valve housing 12 is configured to provide fluid communication between cylindrical inlet 20 and the cylindrical outlet 21 via the valve chamber 14.

As shown in FIG. 13, a valve bonnet 22 is configured to be actuated to 360 regulate the flow of fluid, particularly liquid, particularly water, through the pre-rinse spray valve. The valve bonnet 22 includes a main body 23 having an exterior surface provided with a plurality of flats 24 by which the valve bonnet 22 can be gripped by a tool and manually rotated about a longitudinal axis 16 of the valve bonnet 22. The longitudinal axis 16 of the valve bonnet 22 coincides with the central axis 16 of the valve housing 12. The interior of the main body 23 of the valve bonnet 22 defines a passage extending axially through the main body 23 along the longitudinal axis 16 of the valve bonnet 22. The valve bonnet 22 includes a piston rod 26 that elongates along the longitudinal axis 16 of the valve bonnet 22 and is received to extend through the passage and is slidably retained within the passage. Sealing piston rings 28 are fixed to one opposite end of the piston rod 26, and a plurality of side bores 30 extend transversely through the piston rod 26 adjacent the piston rings 28. The opposite end of the piston rod 26 is a blind end 31. The exterior of the main body 23 of the valve bonnet 22 is provided with a threaded surface 32 that desirably is disposed to face the end of the piston rod 26 that carries the piston rings 28. The threaded surface 32 of the main body 23 of the valve bonnet 22 is configured to mate in a complementary way with the threaded interior surface 18 at the entrance 17 of the valve chamber 14 so that the valve bonnet 22 can be screwed into the valve chamber 14 of the valve housing 12.

As shown in FIG. 1 and FIG. 2, the pre-rinse spray valve 10 includes a handle 33 and a lever 39. One opposite end of the handle is connected to the threaded projection at the cylindrical inlet 20 of the valve housing 12 shown in FIG. 2. The proximal end of the lever 33 defines a fork 34 that defines a slot between a pair of parallel projecting flanges. The slot is configured to receive a tongue flange 35 that protrudes vertically from the exterior surface of the cylindrical outlet 21 of the valve housing 12. The fork 34 and the tongue flange 35 are both apertured in alignment to receive a handle nut 36 through the aligned apertures. The handle nut 36 is secured by a handle screw 37 so that the lever 33 pivots about the handle nut 36. The intermediate portion of the lever 33 rests against the protruding blind end of the piston rod 26 of the valve bonnet 22. The piston rod 26 is spring biased so as to become maintained in the disposition that is shown in FIG. 13.

As shown in FIG. 13, the distal end of the piston rod 26 of the valve bonnet 22 is provided with side bores 30 that extend therethrough in a direction that extends transversely with respect to the central axis 16. When the distal end of the lever 33 is squeezed manually by the user to compress the valve bonnet 22, then the distal end of the piston rod 26 of the valve bonnet 22 moves axially along the central axis 16 within the valve chamber 14 of the valve housing 12 to align the side bores 30 into fluid communication with the cylindrical inlet 20 of the valve housing 12. When the pre-rinse spray valve 10 assumes this operating mode, then a flow path for the movement of fluid is opened through the valve bonnet 22 between the inlet 20 and outlet 21 of the valve housing 12, and accordingly fluid freely flows through the valve housing 12 of the pre-rinse spray valve 10.

The pre-rinse spray valve desirably includes a spray cup 40 connected to the cylindrical outlet 21 of the valve housing 12 and configured with a diverging interior surface that allows the fluid stream exiting from the cylindrical outlet of the valve housing to expand by spreading radially outwardly and accordingly undergo a reduction in the pressure of the fluid exiting from the cylindrical outlet 21 of the valve housing 12. As shown in FIG. 2, the pre-rinse spray valve 10 includes a spray cup 40 that defines a central passage through the spray cup 40 with a conically diverging interior surface when proceeding from the rear end to the front end of the spray cup 40. As shown in FIG. 13, the rear end of the spray cup 40 defines a male flange 41 that is cylindrical and threaded on the exterior surface thereof. The threaded male flange 41 is configured to be screwed into the similarly threaded interior surface 38 of the free end of the cylindrical outlet of the valve housing 12. The spray cup 40 defines a conical horn 42 at the front end of the spray cup 40 that is disposed axially spaced apart from and opposite the male flange 41. The conically diverging interior surface of the spray cup 40 is defined by the interior surface of the conical horn 42, and that interior surface conically diverges about the symmetric axis of the conical horn 42. An annular shoulder 43 is recessed from the free edge of the wider diameter section of the conical horn 42 of the spray cup 40. The interior surface 44 of conical horn adjacent the annular shoulder 43 is threaded.

The pre-rinse spray valve 10 includes a face plate 81 that is configured to organize the expanding slug of fluid exiting from the spray cup 40 into a plurality of parallel streams focused on the target of the pre-rinse spray valve with the desired cleaning power per volume of water exiting the pre-rinse spray valve. As shown in FIG. 2, FIG. 3, FIG. 9, FIG. 10, FIG. 11, FIG. 12, FIG. 14 and FIG. 15, the face plate 81 defines a plurality of spray holes 54. As shown in the cross-sectional views of FIG. 9, FIG. 10, FIG. 11 and FIG. 12, for example, each spray hole 54 is configured to extend axially through the face plate 81 from the front side 55 of the face plate 81 through the back side 56 of the face plate 81.

As shown in FIG. 11, each of the plurality of spray holes 54 is defined in part by a conically diverging interior surface 57 projecting from the back side of the face plate 81. As shown in the cross-sectional views of FIG. 11 and FIG. 15, the back side 56 of the face plate 81 defines a plurality of tapered bosses 58, and each respective one of the plurality of tapered bosses 58 surrounds and defines respective conically diverging surface 57 of a respective spray hole 54. Each conically diverging surface 57 begins beneath the front side of the face plate 81 and gradually widens to the full opening at back side 56 of the face plate 81. So in one sense, each conically diverging surface 57 begins closer to the front side 55 of the face plate 81 than to the back side 56 of the face plate 81. For an embodiment of a pre-rinse spray valve 10 in accordance with the present invention configured to deliver a total of 1.15 gallons of water per minute to the target spaced between 8 and 12 inches from the front side 55 of the valve 10 through six spray holes 54, the diameter of each of the plurality of spray holes 54 at the front side 55 of the face plate 81 desirably is 0.0315 inches, and the conically diverging surface 57 desirably diverges over a distance of 0.17 inches with a radius of 0.40 inches.

As shown in FIG. 3 for example, individual ones of the plurality of spray holes 54 are disposed in a pattern that is symmetric with respect to the center of the face plate 81. As shown in FIG. 3 for example, six spray holes 54 desirably are provided in a pattern with five spray holes 54 symmetrically disposed around a centrally located sixth spray hole 54. The number of spray holes 54, the size of the spray holes 54 and their pattern can be varied to suit the anticipated fluid pressure and the desired volumetric flow of fluid to be expelled from the pre-rinse spray valve 10.

The relatively large circumferences of the respective mating threaded surfaces 44, 86 of the spray cup 40 and the rear end flange 82 permit adequate tightening sufficient to retain the spray face assembly 70 in a watertight fashion against the annular shoulder 43 of the spray cup 40 without unduly stressing the face plate 81 in a manner that would affect the integrity of the spray holes 54.

As shown in FIG. 3 and FIG. 6 for example, the face plate 81 is formed as a unitary molded plastic part that has a plurality of tool projections 72. Each of these tool projections 72 is accessible from the exterior of the pre-rinse spray valve 10. Each tool projection 72 is defined to project away from the front side 55 of the face plate 81 and configured to engage a machine tool (not shown) that can rotate the face plate 81 to screw the spray face assembly 70 into the spray cup 40 during assembly of the pre-rinse spray valve 10.

Incidentally, one advantage of the spray face assembly 70 of the present invention is that it can be used to retrofit pre-rinse spray valves that already have been in service in commercial kitchens for example.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A spray face assembly for a pre-rinse spray valve having a spray cup defining an annular shoulder adjacent a threaded interior surface, the spray face assembly comprising:
   a spray face fixture that includes a spray face and a rear end flange integrally connected to the spray face;
   wherein the spray face defines a back side and a front side disposed opposite the back side and spaced apart from the back side in an axial direction;
   wherein the spray face defines a side rim extending from and connecting the back side to the front side, the back side of the spray face defines a peripheral under portion disposed between the side rim and the rear end flange;
   wherein the spray face defines a first plurality of overmold bores extending axially through the spray face from the front side through the side rim;
   wherein the spray face defines a plurality of spray holes, each of the plurality of spray holes extending axially through the spray face from the front side through the back side;
   wherein the rear end flange defines a front end and a rear end disposed spaced apart from the front end in the axial direction, the rear end flange extending in the axial direction from the back side of the spray face;
   wherein the rear end flange defines a central passage disposed symmetrically about a central axis extending in the axial direction, the rear end flange defines a threaded exterior surface; and
   an overmold permanently attached to the spray face and continuously covering a peripheral region of the front side of the spray face, the side rim of the spray face and the peripheral under portion of the spray face.

2. A spray face assembly as in claim 1, wherein the overmold defines an underside that is disposed in contact with the front side of the spray face, wherein the overmold defines a first plurality of fingers, each of the first plurality of fingers extending in the axial direction from the underside of the overmold.

3. A spray face assembly as in claim 2, wherein the overmold defines a second plurality of fingers, each of the second plurality of fingers extending axially from the underside of the overmold and disposed radially closer to the central axis than the disposition of the first plurality of fingers.

4. A spray face assembly as in claim 1, wherein each of the plurality of spray holes is defined in part by a conically diverging surface projecting from the back side of the spray face.

5. A pre-rinse spray valve as in claim 1, wherein the spray face defines a second plurality of overmold bores extending axially through the spray face from the front side through the peripheral under portion of the spray face.

6. A pre-rinse spray valve as in claim 5, wherein the second plurality of overmold bores is disposed closer to the central axis than the first plurality of overmold bores.

7. A pre-rinse spray valve, comprising:
   a valve housing defining a hollow valve chamber, the valve housing defining an inlet opening connected to the valve chamber, the valve housing defining an outlet opening connected to the valve chamber;
   a valve bonnet received in the valve chamber and disposed between the inlet opening and the outlet opening of the valve housing;
   a handle pivotally connected to the valve housing and configured and disposed to engage and activate operation of the valve bonnet to selectively permit fluid communication between the inlet opening and the outlet opening of the valve housing;
   a spray cup defining a rear side connected to the outlet opening of the valve housing and defining a central opening through the spray cup in fluid communication with the outlet opening of the valve housing, the spray cup defining a conically shaped conical horn that defines an annular shoulder and an internally threaded surface;
   a spray face having a back side disposed opposite a front side, the spray face defining a side rim extending from and connecting the back side to the front side, the spray face defining a rear end flange having a front end and a rear end disposed spaced apart from the front end in an axial direction, the rear end flange extending in the axial direction from the back side of the spray face, the back side of the spray face defining a peripheral under portion disposed between the side rim and the rear end flange, the rear end flange defining a central passage disposed symmetrically about a central axis extending in the axial direction, the rear end flange defining a threaded exterior surface; and
   an overmold permanently attached to the spray face and continuously covering a peripheral region of the front side of the spray face, the side rim of the spray face and the peripheral under portion of the spray face; and
   wherein the spray face defines a first plurality of overmold bores extending axially through the spray face from the front side through the side rim.

8. A pre-rinse spray valve as in claim 7, wherein the overmold defines an underside that is disposed in contact with the front side of the spray face, wherein the overmold defines a first plurality of fingers, each of the first plurality of fingers extending axially from the underside of the overmold and extending through a respective one of the overmold bores of the first plurality of overmold bores.

9. A pre-rinse spray valve as in claim 7, wherein the spray face defines a second plurality of overmold bores extending axially through the spray face from the front side through the peripheral under portion of the spray face.

10. A pre-rinse spray valve as in claim 9, wherein the second plurality of overmold bores is disposed radially closer to the central axis than the disposition of the first plurality of overmold bores, and wherein the overmold defines an underside that is disposed in contact with the front side of the spray face, wherein the overmold defines a second plurality of fingers, each of the second plurality of fingers extending axially from the underside of the overmold and extending through a respective one of the overmold bores of the second plurality of overmold bores.

11. A pre-rinse spray valve as in claim 7, wherein the spray face defines a plurality of tool projections, each tool projection extending in the axial direction away from the front side of the spray face and configured for being received by a tool for facilitating rotation of the spray face into the spray cup during assembly or disassembly of the pre-rinse spray valve.

12. A pre-rinse spray valve as in claim 7, wherein the spray face defines a plurality of spray holes extending axially through the spray face from the front side through the back side, each of the plurality of spray holes is defined in part by a conically diverging surface projecting toward the back side of the spray face.

13. A pre-rinse spray valve as in claim 12, wherein the conically diverging surface begins intermediate the front side and the back side of the face plate.

14. A pre-rinse spray valve as in claim 12, herein the conically diverging surface begins beneath the front side of the face plate.

15. A pre-rinse spray valve as in claim 12, wherein the back side of the face plate defines a plurality of tapered bosses, each one of the plurality of tapered bosses surrounding a respective spray hole.

16. A pre-rinse spray valve as in claim 7, wherein each of the first plurality of overmold bores is arranged equidistantly from the central axis and spaced circumferentially equidistantly from each immediately adjacent one of the other overmold bores of the first plurality of overmold bores.

17. A pre-rinse spray valve as in claim 7, each of the first plurality of overmold bores is spaced equidistantly from each adjacent one of the first plurality of overmold bores.

18. A pre-rinse spray valve as in claim 7, each of the first plurality of overmold bores defines a first diameter.

19. A pre-rinse spray valve as in claim 18, wherein the spray face defines a second plurality of overmold bores extending axially through the spray face from the front side through the peripheral under portion of the spray face, wherein each of the second plurality of overmold bores defines a second diameter that is smaller than the first diameter of each of the first plurality of overmold bores.

* * * * *